Figure 1:
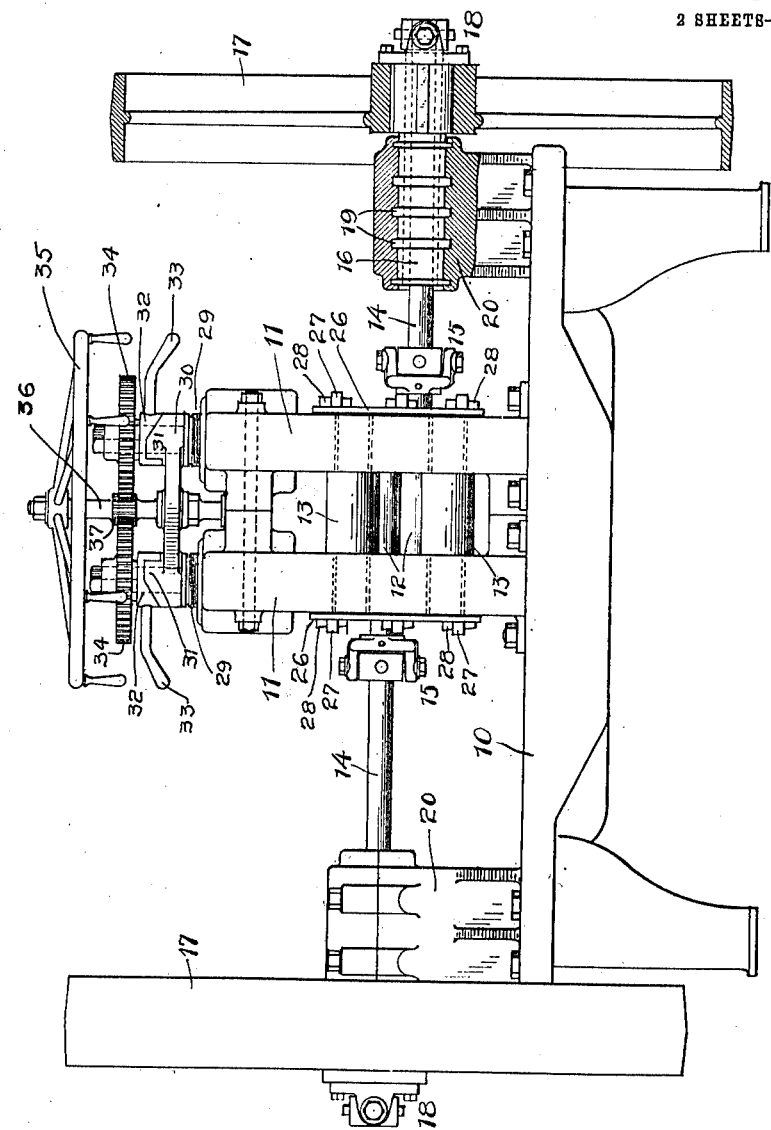

F. A. WILMOT.
ROLLING MILL.
APPLICATION FILED JULY 8, 1912.

1,071,846.

Patented Sept. 2, 1913.
2 SHEETS—SHEET 1.

WITNESSES:
H. W. Meade
S. W. Atherton.

INVENTOR
Frank A. Wilmot
BY
N. M. Wooster
ATTORNEY

F. A. WILMOT.
ROLLING MILL.
APPLICATION FILED JULY 8, 1912.
1,071,846.
Patented Sept. 2, 1913.
2 SHEETS—SHEET 2.
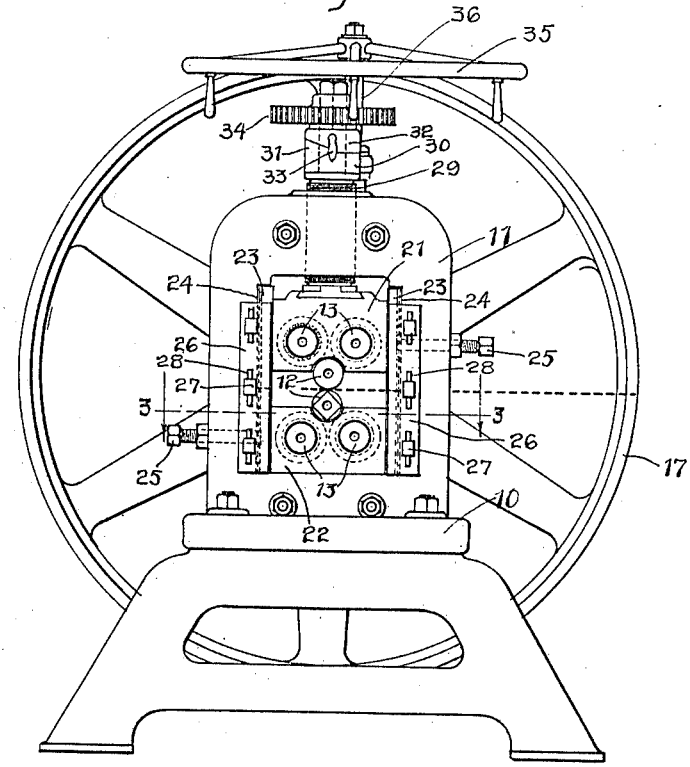
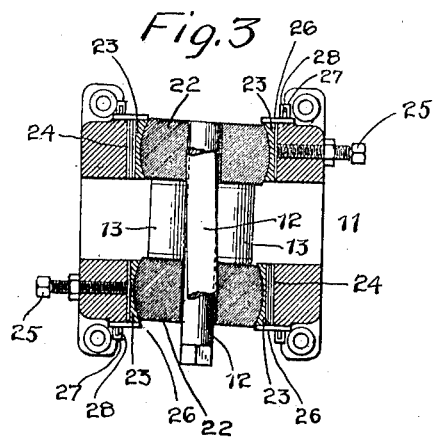
WITNESSES:
INVENTOR
Frank A. Wilmot
BY
ATTORNEY

UNITED STATES PATENT OFFICE.

FRANK A. WILMOT, OF BRIDGEPORT, CONNECTICUT.

ROLLING-MILL.

1,071,846.  Specification of Letters Patent.  Patented Sept. 2, 1913.

Application filed July 8, 1912. Serial No. 708,138.

*To all whom it may concern:*

Be it known that I, FRANK A. WILMOT, a citizen of the United States, residing at Bridgeport, county of Fairfield, State of Connecticut, have invented an Improvement in Rolling-Mills, of which the following is a specification.

This invention relates to rolling mills for either hot or cold rolling to reduce thickness or change sectional areas of strips and bars of metal.

It is one of the objects of the invention to provide means whereby greater uniformity of thickness of the material being reduced may be obtained, especially of materials in the thinner gages, the commercial production of material of uniform thickness having heretofore been practically impossible.

A further object of the invention is to provide a construction which will permit the rolls to be end driven, to be greatly reduced in diameter, and to be made without necks, with the result that they may be uniformly hardened, and with but little danger of cracks developing, and, owing to their reduced diameter, may be ground smooth and true at a great saving in cost and time.

A further object of the invention is to provide means for changing the position of the rolls, so that the material passing through the mill will be reduced at the center to a greater extent than at the edges, or reduced at either edge to a greater extent than at the other edge.

With these and other objects in view, the invention consists in certain constructions and in certain parts, improvements and combinations which I will now describe referring to the accompanying drawings forming a part of this specification and using reference characters to indicate the several parts.

Figure 1 is a front elevation of my novel rolling mill with parts shown in section; Fig. 2 an end elevation as seen from the right in Fig. 1, with the driving wheel and thrust bearing removed; and Fig. 3 is a section on the line 3—3 in Fig. 2, illustrating a method of obtaining angular adjustment of the rolls in a horizontal plane.

10 denotes the bed and 11 a housing rigidly secured thereto, which may be made in one or more pieces as preferred, the sole requirement being rigidity.

12 denotes the work rolls and 13 non-driven supporting rolls. The work rolls are driven by means of shafts 14 connected thereto by universal joints 15. The other ends of the driving shafts pass through bearing sleeves 16 which carry driving wheels 17. The driving shafts and driving wheels are connected by universal joints 18, one member of each joint being attached to a driving shaft and the other to the corresponding driving wheel. Each of the bearing sleeves is provided with external rings or collars 19 which engage corresponding grooves in bearings 20 which are rigidly secured to the bed. This construction gives flexibility to the drive and renders endwise movement of the work rolls and driving shafts impossible.

The work rolls are placed one above the other (as shown in Fig. 2), the lower work roll resting upon two lower supporting rolls and two upper supporting rolls resting upon the upper work roll and taking the entire upward thrust in use, thus providing effective support for the entire operative portion of the work rolls. This renders the use of relatively small end driven rolls, which may be made without necks, practicable, wholly prevents springing of the rolls, and renders the operation of grinding comparatively easy. The upper and lower supporting rolls are journaled respectively in oscillatory bearing blocks 21 and 22 in opposite sides of the housing. The bearing blocks are provided with convex faces which engage corresponding concave faces on holding blocks 23 lying intermediate the bearing blocks and the walls of the housing. For convenience in adjustment, as will presently be more fully explained, I preferably place shims 24 between the holding blocks and the walls of the housing and also provide set screws 25 to take up lost motion and retain the parts in place after adjustment. The holding blocks and bearing blocks are held against lateral displacement by retaining plates 26.

27 denotes lugs which project outward from the housing, pass through holes in the retaining plates and are provided with vertical holes to receive wedge-shaped keys 28 to hold the plates in position. The purpose of the oscillatory bearing blocks and universal joints is to permit the work rolls to be adjusted obliquely in the horizontal plane. Where it is required to reduce material to a greater extent at the center of the strip than at the sides, as in the case of material which has been imperfectly rolled in ordinary types of mills, the desired result is accomplished by shifting the supporting rolls in the manner just described, so as to place the work rolls slightly obliquely to each other, as will be more fully explained.

Where it is required to roll the material to a greater thickness at one edge than the other, the holding pressure upon either or both of the upper bearing blocks is relieved, the necessary upward movement of one end of the upper work roll being permitted by the universal joints.

29 denotes adjusting screws which have threaded engagement with the housing and oppose the upper bearing blocks. Above the threaded portions these screws are reduced and non-threaded and pass through hubs 31 on a yoke 30 which rests upon shoulders at the ends of the threaded portion. The upper ends of the hubs are provided with cam surfaces which are engaged by cams 32 which are free to be rotated on the round portions of the adjusting screws. These cams are shown as provided with handles 33 for convenience in operation. At the upper ends of the adjusting screws are angular portions which engage correspondingly shaped holes in the hubs of gear wheels 34. 35 denotes a hand wheel carried by an adjusting shaft 36 which is journaled in and supported by the yoke and carries a pinion 37 which engages both of the gear wheels.

The operation is as follows: For ordinary use the work rolls and the supporting rolls are parallel. The adjustment of the screws is determined by rotation of the hand wheel, the engagement of the pinion with the gear wheels causing the screws to be raised or lowered in perfect uniformity. The effect of this adjustment is to determine the height to which the upper work roll and the upper supporting rolls can be raised by the passage of the material to be operated upon between the work rolls. In other words, the amount of reduction given to the material under the ordinary conditions of use is determined by raising or lowering the adjusting screws in the manner described. Should it be required to roll stock thinner at one edge than at the other, the upper bearing blocks must be adjusted unequally, that is, one must be higher than the other. This is effected by rotating either of the cams 32, the effect of which is to raise the corresponding gear wheel 34 out of engagement with pinion 37. The hand wheel is then manipulated to give to the other screw 29 the required adjustment to permit that end of the upper work roll and upper supporting rolls to rise the necessary distance to give the required thickness to the corresponding edge of the stock to be operated upon. Having adjusted one end of the upper supporting rolls the other end is adjusted in the same manner. The inoperative gear wheel 34 is permitted to drop into engagement with pinion 37 and the previously operative gear wheel is moved out of engagement with the pinion by operation of the corresponding cam.

A vitally important adjustment of the present mill is the oblique adjustment of the work rolls in the horizontal plane for the purpose of causing greater reduction of a piece of stock at the center than at either edge. This is effected by adjustment of upper and lower bearing blocks 21 and 22 in which the upper and lower supporting rolls, respectively, are journaled. The operator first loosens the set screws 25, which leaves the bearing blocks and holding blocks loose, after which adjustment of the bearing blocks is effected by shifting the shims. Any convenient number of shims may be used. Under ordinary conditions they would be evenly divided; as an illustration, two between each holding block and the housing. Fig. 3 shows an oblique adjustment of the lower bearing blocks supporting rolls and work roll, and also indicates the slightly crossed position of the upper work roll relative to the lower work roll. In making the oblique adjustment, having loosened the set screws the operator would remove one shim from the right side, as seen in Fig. 3, and transfer it to the left side and at the other end of the rolls would remove a shim from the left side and transfer it to the right side, power being applied in any suitable manner to move the holding blocks and bearing blocks, which will of course oscillate the bearing blocks on the holding blocks, as clearly indicated in Fig. 3. The upper work roll and supporting roll are adjusted in the same manner, the bearing blocks and supporting rolls being swung in opposite directions so as to make the work rolls cross at their mid-length, as indicated in Fig. 3. It will of course be apparent that the adjustment of the supporting rolls will impart corresponding adjustment to the work rolls, ample movement of the work rolls being permitted by universal joints 15 and 18.

Having thus described my invention I claim:

1. In a roll-adjustable rolling mill, neckless end driven work rolls capable of endwise movement, and journaled rolls above and below the work rolls which support the work rolls.

2. In a roll-adjustable rolling mill, driven work rolls capable of endwise movement, upper and lower journaled rolls which support the work rolls, and means for adjusting the work rolls obliquely in the horizontal plane.

3. In a roll-adjustable rolling mill, relatively small neckless work rolls capable of endwise movement, flexible driving connections for the work rolls, and means separate from the work rolls for preventing endwise movement of said work rolls.

4. In a roll-adjustable rolling mill, work rolls capable of endwise movement, flexible end driving connections therefor, journaled supporting rolls, and means separate from the work rolls for preventing endwise movement of said rolls.

5. In a roll-adjustable rolling mill, neckless work rolls capable of endwise movement, universal joint driving connections therefor, and means separate from the work rolls for preventing endwise movement thereof.

6. In a roll-adjustable rolling mill, relatively small neckless work rolls capable of endwise movement, flexible means for driving said rolls, means preventing the endwise movement during rotation, upper and lower journaled rolls which support the work rolls, and means for adjusting the upper rolls.

7. In a roll-adjustable rolling mill, upper and lower journaled supporting rolls, work rolls, capable of endwise movement, driving wheels, flexible connections intermediate the driving wheels and the work rolls, and means preventing endwise movement of the work rolls during rotation.

8. In a roll-adjustable rolling mill, upper and lower journaled supporting rolls, work rolls capable of endwise movement, driving shafts for the work rolls, driving wheels, universal joints between the driving shafts and the driving wheels and work rolls respectively, and means preventing endwise movement of the work rolls during rotation.

9. In a roll-adjustable rolling mill, work rolls capable of endwise movement, driving shafts, driving wheels, bearing sleeves by which the driving wheels are carried and through which the driving shafts pass, universal joints between the shafts and the work rolls and driving wheels respectively, and means preventing endwise movement of the work rolls during rotation.

10. In a roll-adjustable rolling mill, work rolls capable of endwise movement, driving shafts, driving wheels, bearing sleeves by which the driving wheels are carried and which are provided with collars, bearings for said sleeves having grooves engaged by the collars, and universal joints between the shafts and the work rolls and driving wheels respectively.

11. In a roll-adjustable rolling mill, driven work rolls capable of endwise movement, means preventing such movement during rotation, journaled supporting rolls, and means for adjusting independently the upward thrust of each end of the upper work roll and supporting rolls.

12. In a roll-adjustable rolling mill, a driven work roll capable of endwise movement, means preventing such movement during rotation, journaled supporting rolls, bearings therefor, an adjusting shaft, and means intermediate said shaft and the bearings whereby independent adjustment of either bearing may be effected.

In testimony whereof I affix my signature in presence of two witnesses.

FRANK A. WILMOT.

Witnesses:
A. M. WOOSTER,
S. W. ATHERTON.